United States Patent [19]

Hashimoto et al.

[11] Patent Number: 5,073,439
[45] Date of Patent: Dec. 17, 1991

[54] MAGNETIC RECORDING MEDIUM COMPRISING A VINYL CHLORIDE BASED RESIN GROUP CONTAINING AN EPOXY GROUP OR A POLAR OR BOTH AND FURTHER A POLYURETHANE RESIN CONTAINING THREE HYDROXYL GROUPS AND ONE POLAR GROUP

[75] Inventors: Hiroshi Hashimoto; Akira Ushimaru; Yuuichirou Murayama, all of Kanagawa, Japan

[73] Assignee: Fuji Photo Film Co., Ltd., Kanagawa, Japan

[21] Appl. No.: 534,898

[22] Filed: Jun. 8, 1990

[30] Foreign Application Priority Data

Jun. 8, 1989 [JP] Japan .................................. 1-146309

[51] Int. Cl.$^5$ .............................................. G11B 23/00
[52] U.S. Cl. .................................. 428/328; 428/424.6; 428/425.9; 428/694; 428/900
[58] Field of Search ............ 428/900, 694, 323, 425.9, 428/424.6, 328

[56] References Cited

U.S. PATENT DOCUMENTS

| | | | |
|---|---|---|---|
| 4,357,378 | 11/1982 | Vaeth et al. | 428/64 |
| 4,791,021 | 12/1988 | Honda et al. | 428/329 |
| 4,863,793 | 9/1989 | Ogawa et al. | 428/323 |
| 4,888,212 | 12/1989 | Iida et al. | 427/130 |

*Primary Examiner*—Merrell C. Cashion, Jr.
*Assistant Examiner*—Stevan A. Resan
*Attorney, Agent, or Firm*—Sughrue, Mion, Zinn, Macpeak & Seas

[57] ABSTRACT

A novel magnetic recording medium is disclosed comprising a non-magnetic support having provided thereon a magnetic layer containing a ferromagnetic powder and a binder, the ferromagnetic powder having a crystalline size of 250 Å or less, and the surface of the magnetic layer having an ultramicrohardness of 40 g/(μm)$^2$ or more.

7 Claims, 1 Drawing Sheet

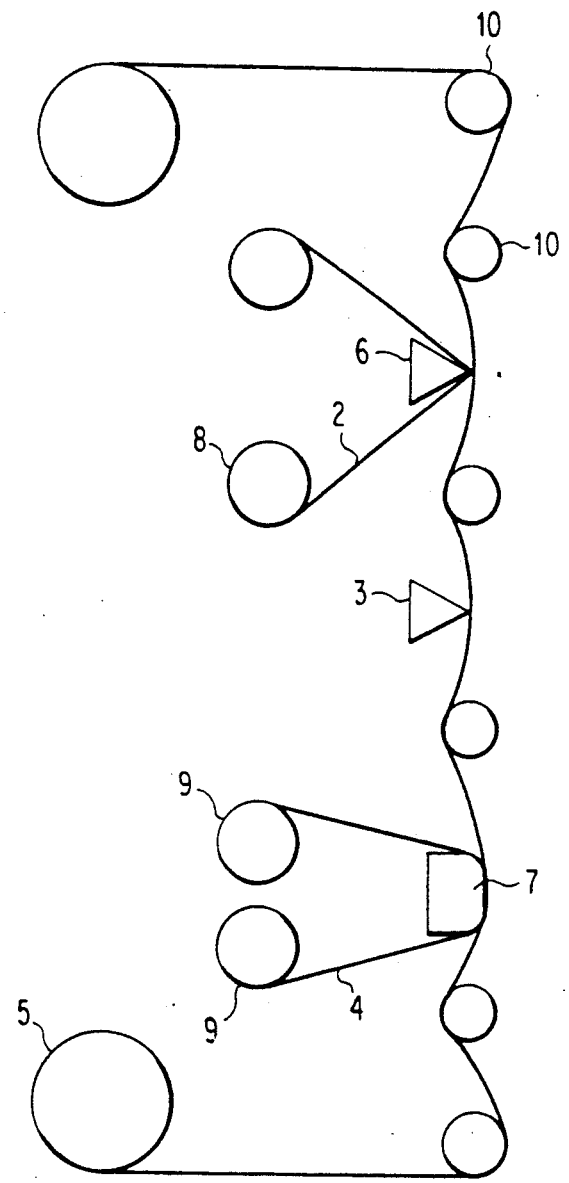

MAGNETIC RECORDING MEDIUM COMPRISING A VINYL CHLORIDE BASED RESIN GROUP CONTAINING AN EPOXY GROUP OR A POLAR OR BOTH AND FURTHER A POLYURETHANE RESIN CONTAINING THREE HYDROXYL GROUPS AND ONE POLAR GROUP

FIELD OF THE INVENTION

The present invention relates to a magnetic recording medium comprising a non-magnetic support having provided thereon a magnetic layer comprising a ferromagnetic powder dispersed in a binder, and more particularly relates to a magnetic recording medium having excellent running performance and durability, particularly with respect to prevention of clogging of the video head.

BACKGROUND OF THE INVENTION

A magnetic recording medium commonly used in audio equipment, video deck and computer applications comprises a non-magnetic support having provided thereon a magnetic layer comprising a ferromagnetic powder dispersed in a binder.

In recent years, there has been a growing demand for high density recording. The demand has been met by decreasing the particle size of ferromagnetic powder or improving the dispersibility of the ferromagnetic powder, the surface properties of the magnetic layer or the ferromagnetic powder packing density.

In particular, an improvement in the dispersibility of ferromagnetic powder has been accomplished by using a dispersant during the preparation of a magnetic coating. In recent years, it has been known that the dispersibility of ferromagnetic powder is improved by using a polyurethane resin containing a metallic sulfonate and vinyl chloride resin as a binder, i.e., by incorporating a polar group into the binder as disclosed in JP-A-61-123017 (the term "JP-A" as used herein means an "unexamined published Japanese patent application"). It is also known that the surface properties of the magnetic layer are improved by increasing the temperature or pressure at which calendering is effected, or by grinding the surface of the magnetic layer by means of a grinder as disclosed in JP-A-63-98834. Furthermore, in order to provide a magnetic recording medium which results in reduced clogging of magnetic head and less drop out, it has been proposed to polish the surface of the magnetic layer with a polishing tape as disclosed in JP-A-63-259830. These approaches effectively reduce the number of grannular components such as the ferromagnetic powder, which are readily separated from the surface of the magnetic layer, to thereby remarkably reduce drop out and clogging of the magnetic head. However, when the crystalline size of the ferromagnetic powder particles is less than 250 Å, sufficient effects are not obtained by simply employing the above described approaches.

In particular, such a magnetic recording medium which is adapted to providing excellent electromagnetic properties for high density recording generally tends to be disadvantageous with respect to deterioration in running performance and durability. Particularly, clogging of the video head (stain on video head which causes a reduction in output) worsens remarkably when a high density recording magnetic recording medium is used.

Thus, even with the use of the above described approaches, magnetic recording medium products which meet both the requirement for reduced clogging of the magnetic head and excellent running performance have not hitherto been obtained.

In order to improve durability, it has been proposed to use a polyurethane resin containing plurality of hydroxyl groups in combination with a vinyl chloride resin to increase the crosslinking density as disclosed in JP-A-55-139634 and 56-101643. However, dispersibility of the ferromagnetic powder is inadequate.

JP-B-63-58869 and 63-55549 (the term "JP-B" as used herein means an "examined Japanese patent publication") propose the use of a polyurethane resin containing plurality of hydroxyl groups in combination with polar groups.

The present inventors have conducted extensive studies to improve both the dispersibility of the ferromagnetic powder and the smoothness of magnetic layer and to reduce clogging of the video head. As a result, the present inventors have discovered that the ultramicrohardness of the surface of the magnetic layer has a pronounced effect on the surface properties and durability of the surface of the magnetic layer, to thereby reduce clogging of the video head. In particular, it was found that the above described disadvantages are remarkably eliminated by properly selecting the crystalline size of the ferromagnetic powder, the curing conditions of the binder (e.g., vinyl chloride resin and polyurethane resin), and the surface properties of the magnetic layer, such that the ultramicrohardness of the magnetic layer is increased.

SUMMARY OF THE INVENTION

An object of the present invention is to provide a magnetic recording medium having an extremely excellent electromagnetic property and excellent running performance and durability, and particularly, to provide a magnetic recording medium which does not result in clogging of the video head, by employing a ferromagnetic powder having an extremely small particle size which is uniformly dispersed in a binder. As a result, the surface properties of the magnetic layer thus prepared are improved, and the packing density of the magnetic powder is increased.

The above and other objectives of the present invention are apparent from the following detailed description and Examples.

The objectives of the present invention are accomplished by providing a magnetic recording medium comprising a non-magnetic support having provided thereon a magnetic layer containing a ferromagnetic powder and a binder, said ferromagnetic powder having a crystalline size of 250 Å or less, and the surface of said magnetic layer having an ultramicrohardness of 40 $g/(\mu m)^2$ or more.

In a preferred embodiment of the present invention, the binder of the magnetic recording medium comprises a vinyl chloride based resin each molecule of which contains at least one polar group selected from the group consisting of $-SO_3M$, $-OSO_3M$, $-PO_3M_2$, $-OPO_3M_2$, $-COOM$, $-NR_2$, and $-N^+R_3X^-$ (wherein M represents a hydrogen atom or an alkyl group, R may be the same or different and each represents a hydrogen atom or an alkyl group, and X represents a halogen atom) and/or an epoxy group.

More preferably, the binder further comprises, in addition to the vinyl chloride based resin, a polyurethane resin each molecule of which containing at least three hydroxyl groups and at least one of the above polar groups.

BRIEF DESCRIPTION OF THE DRAWING

The Figure illustrates one example of the process for forming a magnetic layer having the surface of 40 g/(μm)² or more in ultramicrohardness.

DETAILED DESCRIPTION OF THE INVENTION

In the present invention, the ultramicrohardness is determined by an ultramicrohardness tester. The ultramicrohardness is represented by the depth of an indentation on the magnetic layer developed by a triangle diamond penetrator under a predetermined indentation load. In particular, a tape-shaped specimen is adhered to a 1-μm thick film of the adhesive Aron α241 (manufactured by Toa Gosei Chemical Industry Co., Ltd.) coated on a glass plate. The specimen is the allowed to stand at a temperature of 23° C. and a relative humidity of 70% for 3 days. The specimen is then tested using a dynamic ultramicrohardness tester DUH-50 manufactured by Shimazu Seisakusho Ltd., employing a triangle diamond penetrator with a vertically opposite angle of 115° C. under an indentation load of 0.2 gf. Substituting the depth d (μm) of the indentation thus developed for d in the following equation defines the ultramicrohardness x (gf/(μm)²) of the surface of the magnetic layer.

$$x = 37.8 \times 0.2/d^2$$

The ultramicrohardness of the surface of the magnetic layer is 40 g/(μm)² or more and preferably 45 g/(μm)² or more.

An ultramicrohardness of 40 g/(μm)² or more is much greater than the hardness of prior art magnetic layers. If the ferromagnetic powder is in the form of finely divided particles, i.e., has a crystalline size of 250 Å or less, the magnetic layer can be prepared to have a smooth surface, but such a magnetic layer also generally exhibits a large friction coefficient which causes clogging of the video head. This clogging is caused by binder material or the like being scraped from the portion close to the surface of the magnetic layer. The present inventors have discovered that this problem is solved by hardening the surface of the magnetic layer such that the ultramicrohardness thereof is increased. The strength of the film is remarkably improved by using a binder comprising a vinyl chloride based resin containing per molecule, at least one polar group and/or an epoxy group such that the finely divided ferromagnetic powder having a crystalline size of 250 Å or less is uniformly dispersed therein. To further increase the strength of the film, the binder may further comprise a polyurethane resin containing at least three hydroxyl groups per molecule of said polyurethane resin and at least one polar group, such that the dispersibility of the ferromagnetic powder is improved.

Specific examples of methods for increasing the ultramicrohardness of the surface of the magnetic layer to 40 g/(μm)² or more include a method which comprises using a finely divided ferromagnetic powder having a crystalline size of 250 Å or less such that the ferromagnetic powder is highly dispersed in the binder to thereby increase the packing density thereof; a method which comprises using a vinyl chloride based resin as a main component of the binder, said resin being a hard binder material, preferably having a glass transition temperature of 60° C. or more and a Young's modulus at room temperature of $1 \times 10^{10}$ dyn/cm² or more, and containing, per molecule, at least one polar group and/or an epoxy groups to improve the dispersibility of the ferromagnetic powder; a method which comprises using a binder comprising the above-described vinyl chloride based resin together with a polyurethane resin containing, per molecule, at least three hydroxyl groups and at least one polar group such that the hydroxyl groups react with isocyanate hardner added to the binder to increase the crosslinking density, to thereby increase the hardness and dispersibility of the ferromagnetic powder; and a method which comprises heat treatment of the coated magnetic layer to accelerate the curing reaction. The heat treatment is effected at a temperature of from 50° to 100° C. and a relative humidity of from 70 to 100%, preferably from 80 to 90%, over a time period of from 6 hours to 10 days, and preferably from 12 hours to 3 days. Alternatively, the ultramicrohardness of the surface of the magnetic layer is increased to at least 40 g/(μm)² by an abrasion treatment and/or grinding treatment and optionally a wiping treatment, as described in detail below.

FIG. 1 schematically illustrates one example of the process comprising the steps of the abrasion treatment, grinding treatment and the wiping treatment according to the present invention.

As shown in FIG. 1, a laminated sheet comprising a non-magnetic support and a magnetic recording layer is sent from a sending roll 1. The surface of the magnetic recording layer of the running sheet is then successively subjected to an abrasion treatment using an abrasive tape 2, a grinding treatment using a fixed blade 3 and a wiping treatment using a nonwoven fabric 4. Thus treated sheet is then finally wound around a winding roll 5. An assisting roll 10 assists to smoothly move the laminated sheet.

The abrasive tape 2 is run at a speed of 1 to 3 cm/min in the direction opposite to the running direction of the laminated sheet by means of a roll 8, and pressed by means of a pad 6 to bring into contact with the surface of the magnetic recording layer. Thus, the abrasion of the surface of the magnetic recording layer is performed.

In FIG. 1, the surface of the magnetic recording layer may be abraded at two or more times by providing plural contact positions of the surface of the recording layer and the abrasive tape.

The fixed blade 3 used for the grinding treatment may be replaced with a rotatable blade-grinder. Otherwise, both of the fixed blade and the rotatable blade-grinder can be used in the grinding treatment.

The nonwoven fabric 4 is moved at a speed of 0.5 to 10 cm/min in the direction opposite to the running direction of the laminated sheet by means of a roll 9, and pressed by means of a pad 7 to bring into contact with the surface of the magnetic recording layer. Thus, the wiping of the surface of the magnetic recording layer is performed.

The surface of the magnetic recording layer may be wiped at two or more times by providing plural contact positions of the surface of the recording layer and the nonwoven fabric.

The abrasive tape employable for the abrasion treatment of the invention preferably is a tape used for abrading a magnetic head equipped in a cassette deck, a video deck, etc. The abrasive tape employable in the invention has a Mohs' scale of hardness in the range of 5 to 9, and contains at least one abrasive selected from the group consisting of α-Al$_2$O$_3$, SiO$_3$, Cr$_2$O$_3$, α-Fe$_2$O$_3$, diamond, SnO$_2$ and TiO$_2$.

The abrasive tape employable in the invention can be prepared, for example, in the following manner.

The above-mentioned abrasive is dispersed in a binder solution containing a binder, and if necessary, other additives to prepare a coating solution, and the coating solution is coated over a support. The support having the coated layer is then dried and cut into a desired shape. As the binder, there can be employed thermoplastic resins, thermosetting resins and reactive resins. Those resins can be employed independently or in combination. The binder is employed in an amount of 10 to 200 parts by weight based on 100 parts by weight of the abrasive. The support material for the formation of the abrasive tape can be selected from films or sheets of synthetic resins such as polyester resins (e.g., polyethylene terephthalate), polyolefin resins (e.g., polypropylene), cellulose derivatives, vinyl resins, polycarbonate resins, polyamide resins; non-magnetic metal foils such as aluminum foil and copper foil; metal foils such as stainless foil; papers; and ceramic sheets.

The abrasive tape employable in the invention preferably has a center line average height (Ra) ranging form 0.07 to 0.9. The center line average height of the abrasive tape is measured under the conditions of a cutoff value of 0.8 mm, an operation rate of 0.3 mm/sec., a needle pressure of 0.07 g., a needle diameter of 2 μmR, range of 20 kHz/0.5 mm using a center line average height measuring device (Safcom System of 400b, 403b and 404B).

There is no specific limitation on the abrasive tape employable in the invention, provided that the tape has the above-mentioned characteristics. As a matter of course, a commercially available abrasive tape can be also utilized in the invention.

By subjecting the surface of the magnetic recording layer to the above-mentioned abrasion treatment using an abrasive tape, a particulate component protruding from the surface of the recording layer (e.g., ferromagnetic powder or abrasive), a curing agent of unreacted state existing in the vicinity of the surface of the recording layer, and a deposited material on the surface thereof (e.g., dust in air) are removed away from the surface of the recording layer generally with the binder, to highly smoothen the surface of the recording layer.

Subsequently, the surface of the magnetic recording layer is preferably subjected to a wiping treatment. Examples of the wiping materials employable for the wiping treatment include a suede-type nonwoven fabric and a bonded nonwoven fabric. The suede-type nonwoven fabric is a fabric of single layer structure substantially not containing a binder such as polyurethane in which bundles of polyester fiber are finely interlocked (e.g., Exceine, trade name of Toray Industries, Inc. and Clarino, trade name of Kurare Co., Ltd.). The bonded nonwoven fabric is a fabric in which polyester fiber is bonded with a binder such s polyurethane (e.g., Vilene, trade name of Japan Vilene Co., Ltd). Through the wiping treatment, a deposited material or an organic material can be completely removed away from the surface of the magnetic recording layer, and as a result, the resulting magnetic recording medium can be prominently reduced in occurrence of drop-out and clogging on a magnetic head.

The surface of the magnetic recording layer is preferably subjected to a grinding treatment. The method of grinding the magnetic recording layer is described in Japanese Patent Application No. 61-13184. Examples of the grinders employable for the grinding treatment include a fixed blade, a diamond wheel and a rotatable blade-grinder. The fixed blade has a material of high hardness on the contact portion thereof with the recording layer. Examples of the material of high hardness include sapphire, alumina, cermet, zirconia (zirconium oxide), silicon nitride, silicon carbide, diamond and hard alloys. The diamond wheel is a rotatable grinder in the form of cylinder having a sintered diamond on its outer surface. The retatable blade-grinder is a grinder comprising a rotatable body having a circular section and at least one blade provided on the periphery of the body.

By performing the grinding treatment as described above, the effect given by the aforementioned abrasion treatment using an abrasive tape is also attained. The grinding treatment may be followed by the above-mentioned wiping treatment.

Examples of the ferromagnetic powder for use in the present invention include finely divided ferromagnetic alloy powder, finely divided ferromagnetic iron oxide powder, finely divided Co-doped ferromagnetic iron oxide powder, finely divided ferromagnetic chromium dioxide powder, and barium ferrite. The magnetic recording medium of the present invention is most effective when finely divided ferromagnetic alloy powder is used among the above described finely divided ferromagnetic powders. In particular, the magnetic layer of a magnetic recording medium comprising such a finely divided ferromagnetic alloy powder has excellent surface properties and can record data of short wavelength. However, with providing the magnetic layer an ultramicrohardness of at least 40 g/(μm)$^2$, such a will stain and clog the video head. The finely divided ferromagnetic alloy powder has a metal content of 75% by weight or more, at least 80% by weight of the metal content being a ferromagnetic metal (e.g., Fe, Co, Ni, Fe-Ni, Co-Ni, Fe-Co-Ni). The above described finely divided ferromagnetic alloy, ferromagnetic iron oxide, Co-doped ferromagnetic iron oxide and ferromagnetic chromium dioxide powders for use in the present invention each has an acicular ratio of from 2/1 to 20/1, preferably 5/1 or more, and a mean crystal length of from 0.2 to 2.0 μm. In the present invention, the crystalline size is in the range of 250 Å or less and preferably 200 Å or less (as determined by X-ray diffractometry). When the crystalline size is in this range and the magnetic layer has an ultramicrohardness of at least 40 g/(μm)$^2$, the desired effects of running performance and durability are accomplished.

The vinyl chloride based resin for use as the binder in the magnetic layer of the present invention contains 50 wt % or more, preferably 65 wt % or more, of vinyl chloride or vinylidene chloride as a monomer compound, and the vinyl chloride based resin may contain, as a comonomer, vinyl compounds capable of producing copolymers soluble to a solvent such as methyl ethyl ketone, tobuene, cyclohexanone and like. Example include vinyl chloride/vinyl acetate copolymer, vinyl chloride/vinyl propionate copolymer, vinylidene chloride/vinyl acetate copolymer, copolymer of vinyl chloride with vinyl alcohol, maleic acid and/or acrylic acid, vinyl chloride/vinylidene acetate copolymer, and vinyl chloride/ acrylonitrile copolymer. Preferred among these vinyl chloride based resins are vinyl chloride/vinyl acetate copolymer, vinyl chloride/vinyl propionate copolymer and vinylidene chloride/vinyl acetate copolymer.

The vinyl chloride based resins preferably contain at least one polar group selected from the group consisting of $-SO_3M$, $-OSO_3M$, $-PO_3M_2$, $-OPO_3M_2$, $-COOM$, $-NR_2$ and $-N^+R_3X^-$ (wherein M represents a hydrogen atom, alkaline metal (e.g., Na and K) or ammonium, R represents a hydrogen atom or alkyl group (e.g., methyl, ethyl, and propyl), and X represents a halogen atom) and/or an epoxy group, and those having the polar group and an epoxy group are particularly preferred. Preferred among these polar groups are $-SO_3M$ and $-CO_2M$, more preferably $-SO_3M$. The content of the polar group is preferably in the range of from $1\times10^{-7}$ to $1\times10^{-3}$, more preferably from $1\times10^{-5}$ to $5\times10^{-4}$ equivalent, per g of polymer. If the content of the polar group deviates from this range, the dispersibility of the finely divided ferromagnetic powder becomes poor and the electromagnetic property is drastically deteriorated. One or more, preferably two or more polar groups may be contained in the vinyl chloride resin. If the vinyl chloride based resin further contains hydroxyl groups, the dispersibility of the ferromagnetic powder is effectively improved. The preferred content of the hydroxy group is in the same range as that of the polar group described above. The content of the epoxy grap is preferably in the range of from $1\times10^{31\ 4}$ to $1\times10^{-2}$ mol, more preferably $5\times10^{-4}$ to $5\times10^{-3}$ mol, per g of polymer. The weight average molecular weight of the vinyl chloride based resin is in the range of from 20,000 to 100,000 and preferably 30,000 to 80,000. If the weight-average molecular weight of the vinyl chloride based resin deviates from this range, the dispersibility of the ferromagnetic powder is reduced. These high molecular weight binders can be used singly or in admixture.

In addition to the vinyl chloride based resin, a polyurethane resin containing at least three hydroxy groups and at least one of the above-described polar groups is preferably used together as the binder component of the present invention. The polyurethane resin preferably has the weight average molecular weight of from 20,000 to 100,000, more preferably from 30,000 to 80,000, and the glass treatment temperature of from $-30°$ to $70°$ C. and more preferably from $-10°$ to $50°$ C. Examples include polyester polyurethane resins, polyether polyurethane resins, polyetherester polyurethane resins and polycanbonate polyurethane resins.

Known isocyanate crosslinking agents (e.g., tolylenediisocyanate triadduct of trimethylolpropane) can be added to the binder to facilitate curing. For the purpose, a reaction product of 3 mols of tolylene diisocyanate, xylylene diisocyanate or hexamethylene diisocyanate with 1 mol of trimethylolpropane, a buret adduct of 3 mols of hexamethylene diisocyanate, isocyanurate compounds of 5 mols of tolylene diisocyanate, isocyanurate adducts of 3 mols of tolylene diisocyanate and 2 mols of hexamethylene diisocyanate, and polymers of isophorone and dipheylmethane diisocyanate are preferably used.

The vinyl chloride based resin, the polyurethane resin and the curing agent are generally contained in amounts of from 20 to 50% by weight, from 20 to 50% by weight, and from 10 to 40% by weight, respectively, based on the total weight of the binder.

The binder of the present invention may further comprise other resins including ethylene/vinyl acetate copolymer, cellulose derivatives (e.g., nitrocellulose resin), acrylic resin, polyvinyl acetal resin, polyvinyl butyral resin, epoxy resin, and phenoxy resin. These resin may be contained in an amount of 40 wt % or less based on the total weight of the binder.

A mixture of an acrylic ester oligomer and a monomer can be also used as a binder which is cured by irradiation.

The total content of the binder in the magnetic layer of the magnetic recording medium of the present invention is generally in the range of from 10 to 100 parts by weight, preferably 20 to 40 parts by weight based on 100 parts by weight of the finely divided ferromagnetic powder.

A preferred process for the preparation of a magnetic recording medium of the present invention from these finely divided ferromagnetic powders, binders, etc. is described below. Finely divided ferromagnetic powders form agglomerates due to their magnetic properties and thus are preferably mechanically ground. The grinding step can be incorporated into the preparation process to shorten the subsequent kneading step. The grinding step can be effected by means of simple mill (available from Shinto Kogyo K.K.), sand mill (available from Matsumoto Chuzo Kogyo), sand grinder, two-roll mill, three-roll mill, opening kneader, pressure kneader, continuous kneader, Henschel mixer, or the like. Preferably, the apparatus can be also used in the subsequent kneading step to eliminate the transfer step. In the kneading/dispersion step, the above-described binder and a solvent are first kneaded with the finely divided ferromagnetic powder in the roll mill or kneader, and then dispersed. The dispersion can be effected by means of a sand mill, ball mill, attritor, Henschel mixer or the like. In this step, the binder can be dissolved in the solvent or can be charged into the dispersion apparatus independent of the solvent.

The magnetic coating solution for use in preparing the magnetic recording medium of the present invention may contain a lubricant. Examples of lubricants for use in the present invention include $C_{12-24}$ aliphatic acids, aliphatic esters (e.g., monoesters, polyesters such as esterification products of polybasic acids with sorbitan or glycerine,), aliphatic amides, metallic soaps, higher aliphatic alcohols, monoalkyl phosphates, dialkyl phosphates, trialkyl phosphates, paraffins, silicone oils, aliphatic acid-modified silcone compounds, fluorine oils, perfluoroalkyl esters, perfluoroalkyl group-containing silicone compounds, animal oils, vegetable oils, mineral oils, higher aliphatic amines, and finely divided particles of inorganic substances such as graphite, silica, molybdenum bisulfide, and tungsten bisulfide. Particularly preferred among these lubricants are $C_{14-22}$ aliphatic acids, $C_{14-22}$ aliphatic amides, $C_{22-36}$ aliphatic esters, esters containing perfluoroalkyl groups containing 6 or more carbon atoms, and silicone compounds containing perfluoroalkyl groups containing 6 or more carbon atoms.

The present magnetic coating solution may further comprise additives such as abrasives, dispersants, antistatic agents and anticorrosives. The abrasive for use in the present invention is not specifically limited so long as it has a Mohs' hardness of 5 or more, preferably 8 or more. Examples of abrasives having a Mohs' hardness of 5 or more include $Al_2O_3$ (Mohs' hardness: 9), TiO (Mohs' hardness: 6), $TiO_2$ (Mohs, hardness: 6.5), $SiO_2$ (Mohs' hardness: 7), $SnO_2$ (Mohs' hardness: 6.5), $Cr_2O_3$ (Mohs' hardness: 9), and $\alpha$-$Fe_2O_3$ (Mohs' hardness: 5.5). These abrasives may be used alone or in admixture.

Particularly preferred among these abrasives are abrasives having a Mohs' hardness of 8 or more. If an abrasive having a Mohs' hardness of less than 5 is used, it tends to fall off the magnetic layer, to thereby deteriorate the running durability of the magnetic recording medium. The content of the abrasive is normally in the range of 0.1 to 20 parts by weight, preferably 1 to 10 parts by weight based on 100 parts by weight of the finely divided ferromagnetic powder. As an antistatic agent, carbon black having a mean particle size of 10 to 300 nm is preferably used.

Examples of organic solvents for use in kneading, dispersing, and coating of the magnetic coating solution include ketones such as acetone, methyl ethyl ketone, methyl isobutyl ketone, and cyclohexanone; esters such as methyl acetate, ethyl acetate, butyl acetate, ethyl butylate, and glycol monoethyl ether acetate; ethers such as ethyl ether, glycol dimethuyl ether, glycol monoethyl ether, dioxan, and tetrahydrofuran; aromatic hydrocarbons such as benzene, toluene, and xylene; and chlorinated hydrocarbons such as methylene chloride, ethylene chloride, carbon tetrachloride, chloroform, ethylene chlorohydrin, and dichlorobenzene.

Examples of the non-magnetic support for use in the present invention on which the magnetic coating solution is coated include polyesters such as polyethylene terephthalate, and polyethylene-2,6-naphthalate; polyolefins such as polyethylene and polypropylene; cellulose derivatives such as cellulose triacetate; and plastics such as polycarbonate, polyimide, and polyamide imide. In addition to the above described support materials, non-magnetic metals such as aliminum, copper, tin, zinc and non-magnetic alloys thereof or plastics comprising a metal such as aluminum that has been vacuum-deposited thereon can be used. The thickness of the support is generally in the range of from 3 to 100 $\mu$m, preferably from 3 to 20 $\mu$m for magnetic tape and from 20 to 100 $\mu$m for magnetic disc. The non-magnetic support may be in the form of a film, tape, sheet, disc, card or drum. Various support materials can be selected as necessary depending on the form of the support. The support may be coated on the side opposite the magnetic layer (backing surface) to provide an antistatic effect, to prevent wow and flutter, to improve the strength of magnetic recording medium, to provide a matting of the backing surface, or like purposes.

In the present invention, the magnetic layer formed on the non-magnetic support generally has a thickness of from 0.5 to 10 $\mu$m and preferably from 1 to 5 $\mu$m.

In accordance with the present invention, finely divided ferromagnetic powder having a crystalline size of 250 Å or less is uniformly dispersed in a binder which increases in crosslinking density upon curing, and the resulting dispersion is then subjected to moistening and heat treatment to cure the surface of the magnetic layer such that the ultramicrohardness thereof reaches 40 g/($\mu$m)$^2$ or more, to thereby remarkably reduce the occurrence of clogging of the magnetic head as well as the coefficient of dynamic friction.

The ultramicrohardness range of 40 g/($\mu$m)$^2$ or more is much greater than that of conventional magnetic layers. When the ferromagnetic powder is in the form of finely divided particles, i.e., has a crystalline size of 250 Å or less, the magnetic layer can be prepared to have a smooth surface, but exhibits a high friction coefficient which causes clogging of the video head. This clogging is caused by the binder material or the like being scraped from the portion close to the surface of the magnetic layer. This disadvantage is eliminated in accordance with the present invention by hardening the surface of the magnetic layer such that the ultramicrohardness thereof is increased. In a preferred embodiment of the present invention, the strength of the film is remarkably improved by using a binder comprising a vinyl chloride based resin containing at least one polar group and/or an epoxy group per molecule, the finely divided ferromagnetic powder having a crystalline size of 250 Å or less being uniformly dispersed therein. In another embodiment of the present invention, the binder further comprises a polyurethane resin containing at least three hydroxyl groups and at least one polar group per molecule such that the dispersibility of the ferromagnetic powder is improved.

The present invention is further described below with regard to the following non-limiting Examples. In the Examples, all parts are by weight.

EXAMPLE 1

| | |
|---|---|
| Ferromagnetic Fe—Ni alloy powder (crystalline size: 250 Å; pH: 9) | 100 parts |
| Vinyl chloride/n-butyl acrylate copolymer (content of vinyl chloride monomer: 90 wt %; —SO$_3$Na group: 6 × 10$^{-5}$ eq/g; epoxy group: 50 × 10$^{-5}$ eq/g; —OH group: 40 × 10$^{-5}$ eq/g; polymerization degree: 300) | 10 parts |
| Polyester polyurethane resin (polycaprolactone/n-pentyl glycol/ phthalic acid/diphenylmethane diisocyanate; —SO$_3$Na group: 6 × 10$^{-5}$ eq/g; OH group: 4/molecule; Mw: 50,000) | 8 parts |
| Methyl ethyl ketone | 20 parts |
| Toluene | 20 parts |

These components were kneaded in a Henschel mixer for 2 hours. The following components were then added to the mixture.

| | |
|---|---|
| Carbon black (mean particle size: 40 mm) | 2 parts |
| Abrasive (Al$_2$O$_3$; mean particle diameter: 300 nm) | 5 parts |
| Toluene | 100 parts |
| Cyclohexanone | 50 parts |

The mixture was then dispersed in a ball mill for 10 hours. The following components were then added to the resulting dispersion.

| | |
|---|---|
| Polyisocyanate (available from Nihon Polyurethane K.K.; "Coronate L") | 4 parts |
| Stearic acid | 1 part |
| Myristic acid | 1 part |
| Butoxyethyl stearate | 1 part |
| Isoamyl stearate | 1 part |

The mixture was then stirred for 20 minutes. The material was then coated on a 7-$\mu$m thick polyethylene terephthalate base, magnetically oriented, dried, calendered, subjected to heat treatment at a temperature of 60° C. for 2 days, and cut into 8-mm wide strips. The surface of the magnetic layer on the tape specimen was then lengthwise rubbed with a single-edged blade ("Feather S single-edged blade", produced by Feather Anzen Kamisori K.K.) ten times in such a manner that the tape specimen was run at a speed of 50 m/min with the tape tension of 200 gf/8-mm width on two rolls disposed at an interval of 200 mm and pushed down by 10 mm at the middle point between the two rolls with the blade held at a right angle to the surface of the running tape specimen, whereby an 8-mm video tape specimen was prepared.

EXAMPLE 2

An 8-mm video tape specimen was prepared in the same manner as in Example 1, except that the rubbing with the single-edged blade was effected only twice.

EXAMPLE 3

An 8-mm video tape specimen was prepared in the same manner as in Example 1, except that the material which had been calendered was exposed to an atmosphere of 70° C. and 90 % RH for 1 sec., then wound, next subjected to heat treatment at a temperature of 70° C. for 1 day, and then cut into 8-mm wide strips. The blade treatment was not carried out in this Example.

EXAMPLE 4

An 8-mm video tape specimen was prepared in the same manner as in Example 1, except that the vinyl chloride/n-butyl acrylate copolymer was replaced by a vinyl chloride/vinyl acetate copolymer (content of vinyl chloride monomer: 90 wt %; polymerization degree: 400) containing —OPO$_3$H$_2$ group and OH groups in amounts of $6 \times 10^{-5}$ eq/g and $3 \times 10^{-4}$ eq/g, respectively.

EXAMPLE 5

An 8-mm video tape specimen was prepared in the same manner as in Example 1, except that the polyurethane resin was replaced by a polyester polyurethane containing a —COOH group in an amount of $1 \times 10^{-4}$ eq/g and six OH groups per molecule, and having a weight average molecular weight of 40,000.

COMPARATIVE EXAMPLE 1

An 8-mm video tape specimen was prepared in the same manner as in Example 1, except that the heat treatment and the blade treatment were not effected.

COMPARATIVE EXAMPLE 2

An 8-mm video tape specimen was prepared in the same manner as in Comparative Example 1, except that the polyurethane resin was replaced by a polar group-free polyester polyurethane containing two OH groups per molecule and having a weight average molecular weight of 60,000.

TABLE 1

| | Ultramicrohardness gf/($\mu$m)$^2$ | Clogging Occurence*1 | Dynamic Friction Coefficient*2 |
|---|---|---|---|
| Example No. | | | |
| 1 | 57 | None | 0.23 |
| 2 | 52 | " | 0.25 |
| 3 | 43 | " | 0.26 |
| 4 | 48 | " | 0.25 |
| 5 | 40 | " | 0.27 |
| Comp. Ex. No. | | | |
| 1 | 37 | 3 passes | 0.31 |

TABLE 1-continued

| Ultramicrohardness gf/($\mu$m)$^2$ | Clogging Occurence*1 | Dynamic Friction Coefficient*2 |
|---|---|---|
| 2    31 | 4 passes | 0.33 |

*1Occurrence of clogging: A 120-min. tape specimen under evaluation was allowed to run repeatedly in an 8-mm VTR (FUJIX-8, available from Fuji Photo Film Co., Ltd.) 100 times in an atmosphere of 23° C. and 20% RH. The occurrence of clogging is reported in terms of the number of passes at which clogging (state in which an output drop of 6 dB or more continues for 1 minute or more) appears.
*2Dynamic friction coefficient: A specimen under evaluation was placed on a polished 115.8-mm diameter Y alloy drum, one of the ends thereof being weighted by a load Wo and the other being measured for tension W by a tension detection apparatus. With the rotation of the drum at 31.4 r.p.m., the tape specimen was subjected to friction at a relative speed of 19.0 cm/sec. The dynamic friction coefficient is reported as given by the following equation:

Dynamic friction coefficient $(\mu) = \frac{1}{\pi} \ln \frac{W}{W_0}$

Table 1 clearly shows that the samples of the present invention having a magnetic layer with an ultramicrohardness of 40 g/($\mu$m)$^2$ or more and comprising a feromagnetic powder having a crystalline size of 250 Å or less do not result in clogging of the video head and exhibit a sufficiently low dynamic friction coefficient. On the other hand, Comparative Example Nos. 1 and 2 having a magnetic layer with an ultramicrohardness of less than 40 g/($\mu$m)$^2$ resulted in clogging and exhibited a greator dynamic friction coefficient.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing a ferromagnetic powder and a binder, said ferromagnetic powder having a crystalline size of 250 Å of less, said binder comprising a vinyl chloride based resin having a weight average molecular weight in the range of from 20,000 to 100,000 each molecule of which containing an epoxy group or at least one polar group in an amount of from $1 \times 10^{-7}$ to $1 \times 10^{-3}$ equivalent per gram of vinyl chloride based resin or both said at least one polar group selected from the group consisting of —SO$_3$M, —OSO$_3$M, —PO$_3$M$_2$, —OPO$_3$M$_2$, —COOM, —NR$_2$, and —N$^+$R$_3$X$^-$ wherein M represents a hydrogen atom or alkyl group, R may be the same or different and each represents a hydrogen atom or alkyl group, and X represents a halogen atom, said binder further comprising a polyurethane resin each molecule of which contains at least three hydroxyl groups and at least one of the polar group, and the surface of said magnetic layer having an ultramicrohardness of 40 g/($\mu$m)$^2$ or more.

2. A magnetic recording medium as in claim 1, wherein said vinyl chloride based resin further contains a hydroxy group.

3. A magnetic recording medium as in claim 1, wherein the content of the epoxy group is in the range of form $1 \times 10^{-4}$ to $1 \times 10^{-2}$ mol per gram of vinyl chloride based resin.

4. A magnetic recording medium as in claim 1, said binder contains the vinyl chloride based resin and the polyurethane resin in amounts of 20 to 50% by weight and 20 to 50% by weight, respectively.

5. A magnetic recording medium as in claim 1, wherein the total content of the binder in the magnetic layer is in the range of from 10 to 100 parts by weight based on 100 parts by weight of the ferromagnetic powder.

6. A magnetic recording medium as in claim 1, wherein said vinyl chloride based resin contains at least 50 wt % of vinyl chloride or vinylidene chloride as a monomer component.

7. A magnetic recording medium as in claim 6, wherein said vinyl chloride based resin is a vinyl chloride/vinyl acetate copolymer, a vinyl chloride/vinyl propionate copolymer, or a vinylidene chloride/vinyl acetate copolymer.

* * * * *